(No Model.) 2 Sheets—Sheet 1.
J. MARQUARDT.
DEVICE FOR RELEASING DRAFT HORSES.
No. 576,594. Patented Feb. 9, 1897.
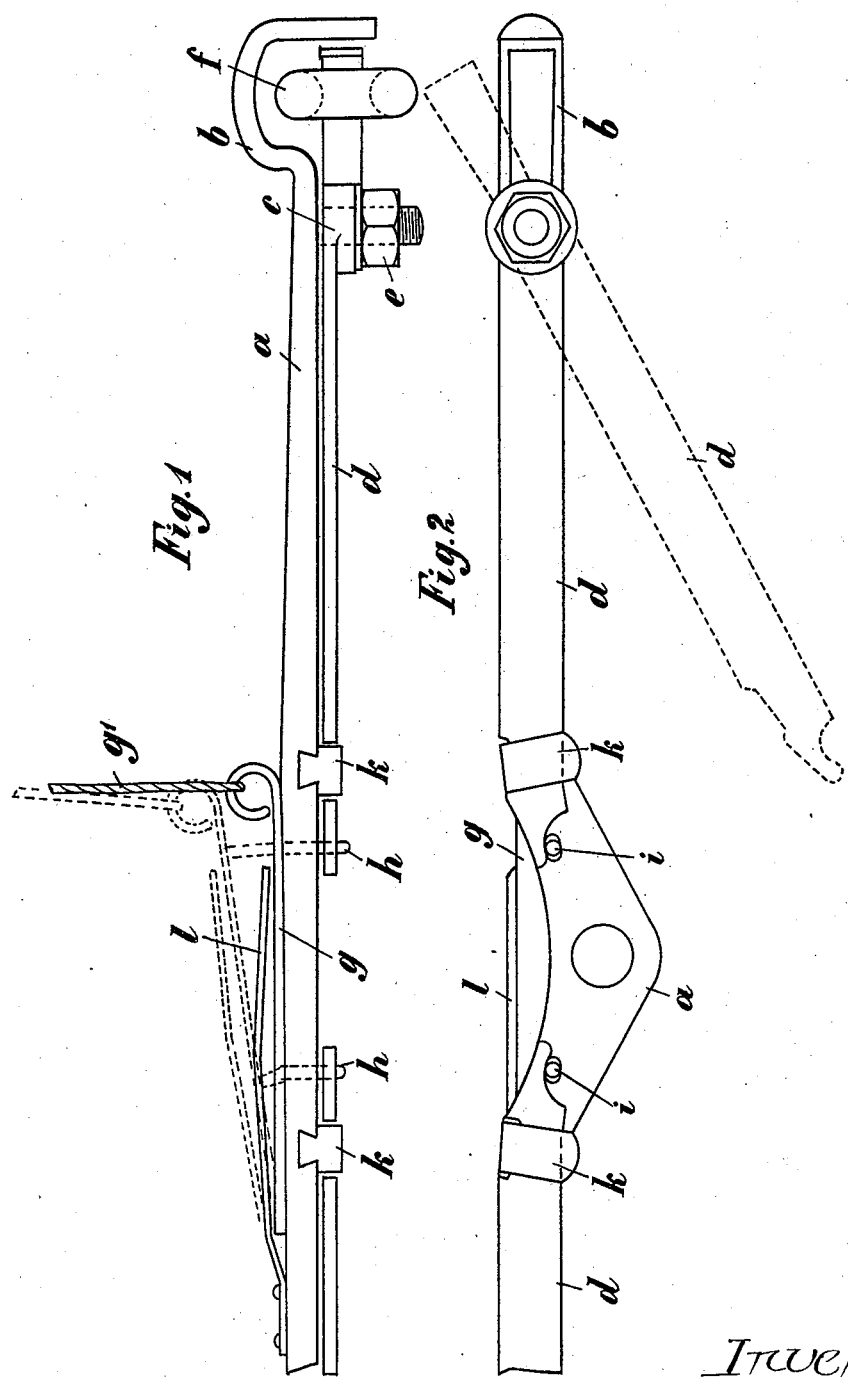

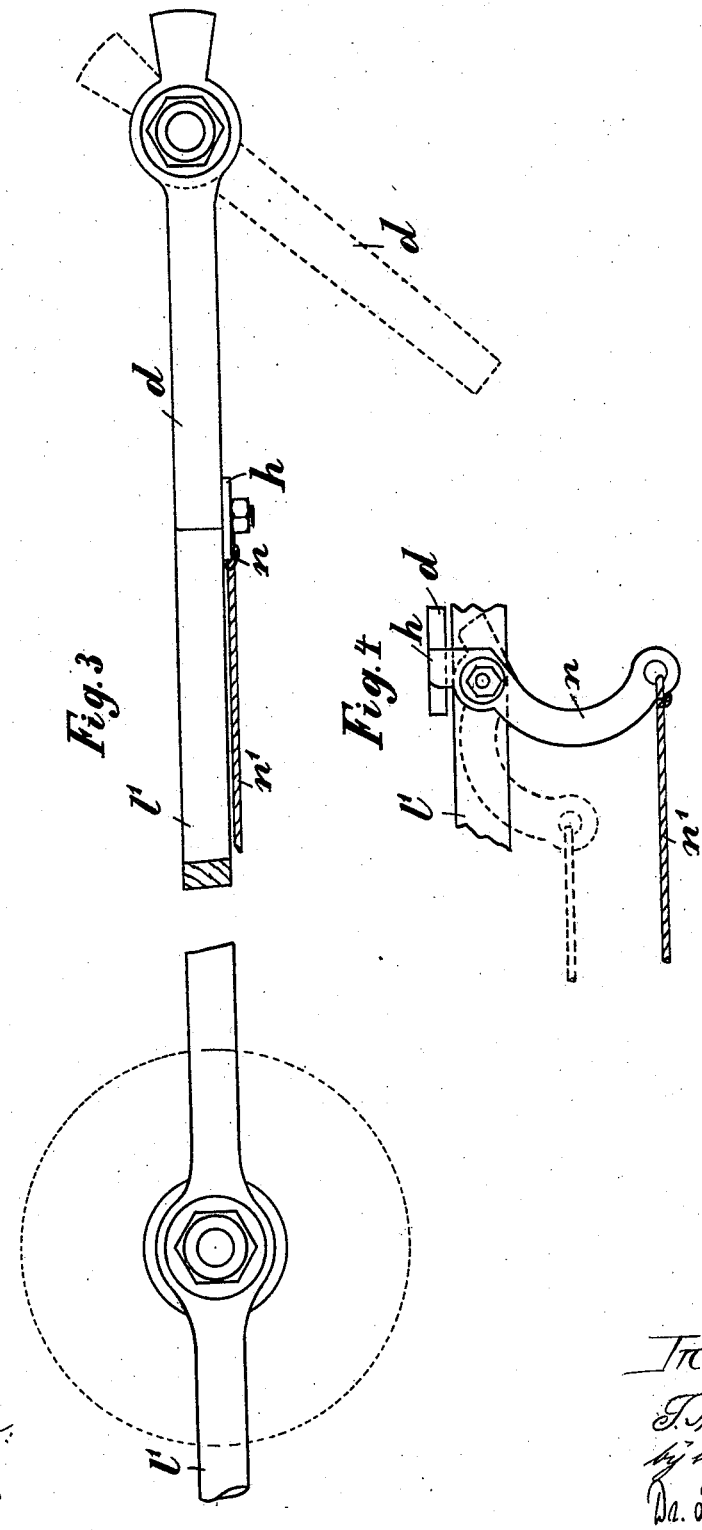

UNITED STATES PATENT OFFICE.

JACOB MARQUARDT, OF MUMMENDORF, FEMERN, GERMANY.

DEVICE FOR RELEASING DRAFT-HORSES.

SPECIFICATION forming part of Letters Patent No. 576,594, dated February 9, 1897.

Application filed February 7, 1896. Serial No. 578,377. (No model.)

*To all whom it may concern:*

Be it known that I, JACOB MARQUARDT, of Mummendorf, Femern, in the Kingdom of Prussia, German Empire, have invented new and useful Improvements in Arrangements for Setting Draft-Horses Free while Traveling, of which the following is a specification.

By pulling a cord provided for the purpose it is rendered possible by the new arrangement to instantly disengage the traces of draft-horses from the vehicle when disturbances of any kind whatever occur.

On the accompanying drawings, Figure 1 represents the front view of a swing-tree provided with the new arrangement. Fig. 2 is the bottom view of such a swing-tree. Fig. 3 shows the top view of a horse-capstan. Fig. 4 is the side view of a part belonging to such a tree of a capstan.

In Figs. 1 and 2 the real swing-tree is indicated by letter $a$. Both the ends $b$ of this tree are bent in such a manner that they form open parts, that is to say, each of them nearly takes the shape of a reversed U. Not far from these bendings two studs $c$ are found at the bottom part of the swing-tree, forming pivots for two straight levers $d$, and being provided with nuts $e$ in order to prevent said levers from slipping of themselves. The shorter ends of these levers $d$ serve for hooking in links or rings $f$, to which the traces are to be attached. In order to dispense with separate attaching-links $f$, these shorter ends of the levers $d$ must be made long enough to nearly close the U-shaped bendings of the swing-tree. They only give way when the longer parts of the levers $d$ are turned aside by considerable force, in which case the levers $d$ take the position shown in Fig. 2 by dotted lines, and the traces are thus automatically disconnected from the tree.

The middle part of the swing-tree carries an arrangement for keeping the levers $d$ firmly in their normal or first position, and in case of need for easily disengaging them from this position. This arrangement shows the following features: On the top surface of the swing-tree a plate-band $g$ is loosely attached by two pins $h$, which pass through two longitudinal openings $i$ of the tree and project beneath the latter. Here they are made use of as stops for the longer parts of the levers $d$. Band $g$ at one of its ends is formed into a loop or ring. On the swing-tree are found two other stops $k$, which serve the same purpose as the projecting pins $h$. A spring $l$ being fixed at one of its ends to the upper surface of the swing-tree and pressing with the other end upon plate-band $g$, keeps the latter down as long as it is not pulled upward by means of cord $g'$, which is fastened to the loop of band $g$ and which may be handled by the coachman or any other operator. At the same moment as cord $g'$ is pulled upward the two pins $h$ are lifted, and the longer parts of the levers $d$, losing their hold, give way to the pull of the horses, which being harnessed to the shorter ends of the levers $d$ will cause the latter to be turned round their pivots until the links or rings $f$ of the traces disengage automatically, whereby the carriage is immediately stopped.

The new arrangement is handled and prepared for operating purposes in the following way: First, the links or rings $f$ of the traces are put upon the shorter ends of the levers $d$. Then the longer parts of the latter are turned round their pivots toward the swing-tree—at the same time pulling upward cord $g'$—until they touch the stops $k$, when by releasing cord $g'$ the pins $h$ are caused by the pressure of spring $l$ to project beneath the bottom surface of the swing-tree, and the levers $d$ being thus kept back by pins $h$ are now prevented from turning round their pivots.

If the arrangement is to be added to horse-capstans, only one lever $d$ is made use of with each tree.

In Figs. 3 and 4 the trees are indicated by $l'$. The straight lever, free to turn round a pivot, is lettered by $d$. By means of stud and nut this lever $d$ is attached to the tree exactly in the same manner as those in Fig. 1; but in this case the longer arm of lever $d$ rests freely upon the tree, while the shorter arm of it projects beyond the extremity of the swing-tree.

For keeping lever $d$ in its normal position, and for rendering its disengagement possible, an arm $n$, free to turn round a pivot, is provided at the back side of the swing-tree $l'$. This arm $n$ has at one end an eye or a ring for attaching cord $n'$ and at its other end a stop or cam $h$ for keeping the longer part of lever $d$ in its first position. As long as cord $n'$ is not pulled arm $n$ takes an upright position in consequence of its weight, and lever $d$ is maintained straight upon the swing-tree, (see Fig. 4;) but in the same moment as the operator of the capstan pulls cord $n'$ arm $n$ is caused to take the position indicated by dotted lines in Fig. 4, whereby stop or cam $h$ is turned down under the level of lever $d$. The latter losing its hold now gives way to the pull of the horse and turns on its pivot until the trace disengages itself from the shorter lever-arm.

Having now described my invention, what I claim, and desire to secure by Letters Patent, is—

In an arrangement for setting draft-horses free while traveling the combination of a swing-tree both ends of which are bent, thereby forming open parts, and provided with two studs arranged at the bottom part of the said swing-tree not far from the bendings of the same, with two turning-levers pivoted to the said studs of the tree, the shorter ends of these levers being made long enough to nearly close the U-shaped bendings of the swing-tree, with a spring plate-band arranged at the middle part on the top surface of the swing-tree and provided with two pins passing through two longitudinal openings of the swing-tree and projecting beneath the same, said plate-band being in connection with a cord fastened to a loop of the said plate-band, and with two stops attached to the swing-tree and not far from the middle part of same; as and for the purpose set forth.

In testimony that I claim the foregoing as my invention I have signed my name in presence of two subscribing witnesses.

JACOB MARQUARDT.

Witnesses:
MAX NIRUS,
GUSTAV VOGLE.